US008311553B2

(12) United States Patent
Iwamura et al.

(10) Patent No.: US 8,311,553 B2
(45) Date of Patent: *Nov. 13, 2012

(54) BASE STATION, MOBILE STATION AND TARGET CELL DETERMINATION METHOD

(75) Inventors: Mikio Iwamura, Yokohama (JP); Minami Ishii, Yokohama (JP); Sadayuki Abeta, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 12/377,347

(22) PCT Filed: Aug. 14, 2007

(86) PCT No.: PCT/JP2007/065856
§ 371 (c)(1),
(2), (4) Date: Mar. 18, 2009

(87) PCT Pub. No.: WO2008/023611
PCT Pub. Date: Feb. 28, 2008

(65) Prior Publication Data
US 2010/0056172 A1    Mar. 4, 2010

(30) Foreign Application Priority Data
Aug. 22, 2006   (JP) .................. 2006-225929

(51) Int. Cl.
*H04W 72/00*    (2009.01)
(52) U.S. Cl. .................. 455/453; 455/436; 370/331
(58) Field of Classification Search .......... 455/405–409, 455/422.1–425, 432.1, 435.1–435.3, 436–445, 455/449–453, 485, 461, 466
See application file for complete search history.

(56) References Cited

U.S. PATENT DOCUMENTS

| | | | |
|---|---|---|---|
| 6,393,003 B1 * | 5/2002 | Lee ................................ | 370/331 |
| 2001/0006515 A1 * | 7/2001 | Lee et al. ...................... | 370/331 |
| 2005/0075125 A1 * | 4/2005 | Bada et al. .................... | 455/525 |
| 2005/0096016 A1 * | 5/2005 | Tervo et al. ................ | 455/414.1 |
| 2006/0183482 A1 * | 8/2006 | Ueda ............................. | 455/439 |

FOREIGN PATENT DOCUMENTS

| | | |
|---|---|---|
| JP | 10-322760 A | 12/1998 |
| JP | 2003-169379 A | 6/2003 |
| JP | 2005-020376 A | 1/2005 |

(Continued)

OTHER PUBLICATIONS

International Search Report w/translation from PCT/JP2007/065856 dated Dec. 4, 2007 (4 pages).

(Continued)

*Primary Examiner* — Ajit Patel
*Assistant Examiner* — Erica Navar
(74) *Attorney, Agent, or Firm* — Osha Liang LLP

(57) ABSTRACT

One feature of the present invention relates to a base station for operating multiple cells each having a predefined bandwidth, including: a load measurement unit configured to measure traffic status in each of the cells; a redirected cell determination unit configured to determine either a redirected cell or a cell layer as redirected cell information for redirecting a mobile station based on the traffic status, the redirected cell and the cell layer to which the mobile station is to be redirected; and a transmission unit configured to transmit the redirected cell information to the mobile station in a paging channel.

5 Claims, 7 Drawing Sheets

FOREIGN PATENT DOCUMENTS

| | | |
|---|---|---|
| JP | 2005-341432 A | 12/2005 |
| JP | 2006-222845 A | 8/2006 |
| WO | 2005/094100 A1 | 10/2005 |

OTHER PUBLICATIONS

Written Opinion from PCT/JP2007/065856 dated Dec. 4, 2007 (4 pages).
Patent Abstracts of Japan; Publication No. 2005-341432 dated Dec. 8, 2005; NTT DoCoMo Inc. (1 page).
Patent Abstracts of Japan; Publication No. 2006-222845 dated Aug. 24, 2006; NEC Corp. (1 page).
Patent Abstracts of Japan; Publication No. 10-322760 dated Dec. 4, 1998; Toshiba Corp. (1 page).
3GPP TR 24.814 V7.0.0; "Physical layer aspects for evolved Universal Terrestrial Radio Access (UTRA)"; Jun. 2006 (126 pages).
3GPP TR 25.813 V7.0.0; "Radio interface protocol aspects"; Jun. 2006 (39 pages).
3GPP TS 25.304 V6.9.0; "User Equipment (UE) procedures in idle mode and procedures for cell reselection in connected mode"; Mar. 2006 (38 pages).
3GPP TS 25.331 V6.10.0; "Protocol Specification"; Jun. 2006 (1226 pages).
J. Laiho, et al.; "Radio Network Planning and Optimisation for UMTS"; John Wiley & Sons, Chichester, 2002, pp. 229-231 (3 pages).
3GPP TSG RAN WG2 #52; R2-060934; Load Sharing using Cell Reselection; T-Mobile; Mar. 27-31, 2006 (4 pages).
Chinese Office Action issued in Chinese Application No. 200780030752.0 mailed on Mar. 24, 2011 and English Translation thereof, 11 pages.

* cited by examiner

FIG.3
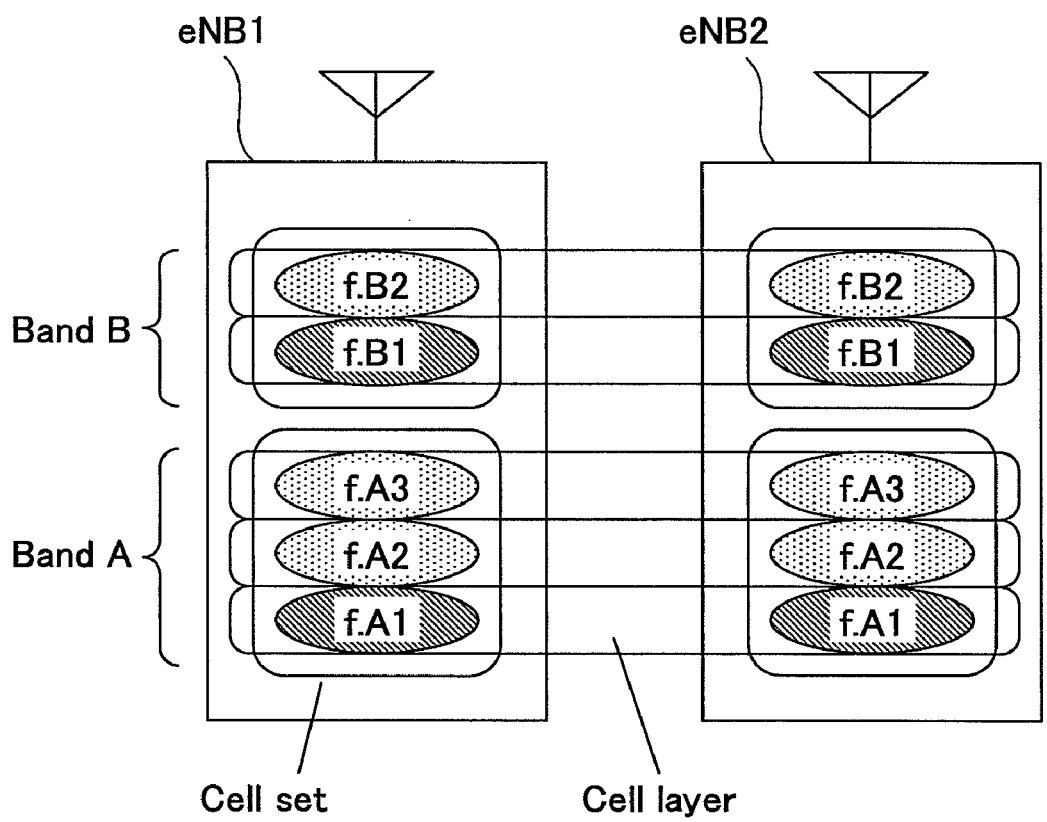
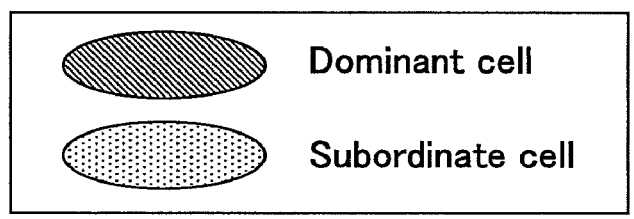

BASE STATION, MOBILE STATION AND TARGET CELL DETERMINATION METHOD

TECHNICAL FIELD

The present invention generally relates to LTE (Long Term Evolution) systems and more particularly relates to base stations, mobile stations and redirected cell determination methods.

BACKGROUND ART

As a next generation mobile communication system, a LTE (Long Term Evolution) system, which is a mobile communication system enabling data transmissions at 100 Mbps, has been intensively researched and developed.

Such a LTE system may be initially operated with a smaller number of carriers, as illustrated in FIG. 1. For example, the LTE system is initially operated with Band A. If the frequency band becomes insufficient after a few years, license for new Band B may be obtained, or another band used for a currently operated 3G system may be reassigned to the LTE system, so that the LTE system can be operated with Bands A and B. In addition, it is expected that the LTE system may be operated with Bands C and D in future. The term "band" used herein means a frequency band, such as 800 MHz band or 2 GHz band, where the LTE system is operated. Also, the term "carrier" used herein means a bandwidth for a system operated in a frequency band, and the demand may be that the carrier can correspond to any of 1.25 MHz, 2.5 MHz, 5 MHz, 10 MHz, 15 MHz and 20 MHz in the LTE system.

In this situation, there may initially exist only mobile stations or user equipment (UE) capable of transmission and reception in Band A (hereinafter referred to as "Band A capable UEs"), but mobile stations capable of transmission and reception in Bands A and B (hereinafter referred to as "Band A+B capable UEs") may be additionally provided after a few years. Even if Band B were newly introduced, the Band A capable UEs would not be able to use Band B for transmission and reception.

In the future, mobile stations capable of transmission and reception in Bands A, B, C and D (hereinafter referred to as "Band A+B+C+D capable UEs") may be additionally introduced. Thus, the same operator's network may be operated with multiple bands and multiple carriers, and different types of mobile stations with different transmission and reception capability may coexist.

If it comes to this situation, load balancing that can handle different transmission and reception capabilities of mobile stations may be required. For example, in a system operated with several bands and/or carriers, if mobile stations are concentrated in a certain carrier, the carrier may be intensively used for transmission and reception despite other bands and/or carriers being not fully used, resulting in degraded communication quality.

For the load balancing, there may be two types of load balancing schemes, traffic load balancing and camp load balancing. In the traffic load balancing, active users, that is, presently communicating users, maybe uniformly distributed. In the camp load balancing, idle users, that is, users waiting for call, may be uniformly distributed.

For example, an article written by J. Laiho, A. Wacker and T. Novosad "Radio Network Planning and Optimisation for UMTS" (John Wiley & Sons, Chichester, 2002, p. 229-231) describes UMTS-GSM load balancing in conjunction with UMTS cell design.

Also, an article "Load sharing using cell reselection" (T-Mobile, R2-060934, TSG-RAN WG2 #52, Athens, Mar. 27-31, 2006) describes LTE-UMTS load balancing particularly for cases of where multiple operators share a network.

However, the load balancing has not been discussed from the viewpoint of separation between the traffic load balancing and the camp load balancing.

DISCLOSURE OF INVENTION

Problem to be Solved by the Invention

In the load balancing, 1) reduction in load of OAM (Operation and Management), 2) reduction in delay, for example, a time period for transition from IDLE to ACTIVE, 3) reduction in load of measurement of adjacent cells by mobile stations during waiting period, and 4) reduction in signaling during waiting periods and others may be required.

Therefore, the present invention is intended to overcome at least one of the above-mentioned problems, that is, to address at least one of the above requirements. One object of the present invention is to provide a base station, a mobile station and a redirected cell determination method that can reduce load on a mobile station for measurement of adjacent cells during waiting periods.

Means for Solving the Problem

In order to overcome the above problem, one feature of the present invention relates to a base station for operating multiple cells each having a predefined bandwidth, including: a load measurement unit configured to measure traffic status in each of the cells; a redirected cell determination unit configured to determine either a redirected cell or a cell layer as redirected cell information for redirecting a mobile station based on the traffic status, the redirected cell and the cell layer to which the mobile station is to be redirected; and a transmission unit configured to transmit the redirected cell information to the mobile station in a paging channel.

According to this configuration, it is possible to determine either the redirected cell or the cell layer for the mobile station based on the traffic status in multiple cells each of which has a predefined bandwidth and is operated by the base station and transmit either of the redirected cell or the cell layer determined in the paging channel.

Another feature of the present invention relates to a mobile station, including: a reception quality measurement unit configured to measure reception quality in either a redirected cell or a cell layer specified by a base station; and a control plane processing unit configured to establish a connection to either the redirected cell or a cell selected from the cell layer if the measured reception quality satisfies a predefined threshold, wherein the base station operates multiple cells each having a predefined bandwidth, measures traffic status of each of the cells, determines either the redirected cell or the cell layer for the mobile station based on the traffic status and transmits either the redirected cell or the cell layer determined in a paging channel.

According to this configuration, it is possible to establish a connection to either the redirected cell or the cell layer specified by the base station.

Another feature of the present invention relates to a method of determining a redirected cell, including: measuring traffic status of multiple cells at a base station, each of the cells having a predefined bandwidth and operated by the base station; determining either a redirected cell or a cell layer at the base station as redirected cell information for redirecting a mobile station based on the traffic status, the redirected cell and the cell layer to which the mobile station is to be redirected; and transmitting the redirected cell information from the base station to the mobile station in a paging channel.

According to this configuration, it is possible to determine either the redirected cell or the cell layer for the mobile station based on the traffic status in multiple cells each of which has a predefined bandwidth and is operated by the base station and transmit either of the redirected cell or the cell layer determined in the paging channel.

Advantage of the Invention

According to the embodiments of the present invention, it is possible to realize a base station, a mobile station and a redirected cell determination method that can reduce the load on a mobile station for measurement of adjacent cells during waiting periods.

BRIEF DESCRIPTION OF DRAWINGS

FIG. 3 is a schematic diagram illustrating cells, cell sets and cell layers.

LIST OF REFERENCE SYMBOLS

Figure 1:
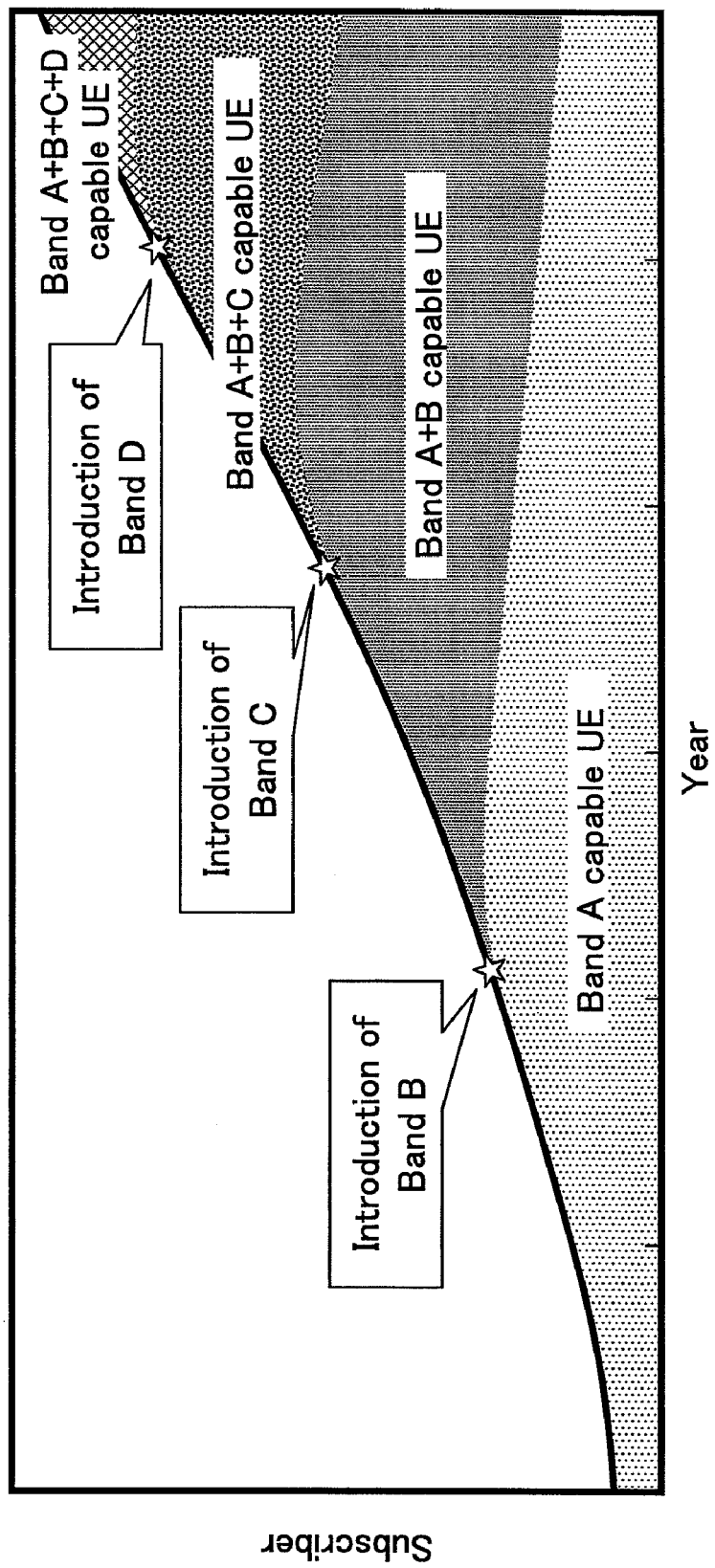
FIG. 1 is a schematic diagram illustrating increasing bands for use in a LTE system.

100: base station
102: transmission and reception unit
104: dominant cell processing unit
106, 111, 118, 202: RF circuit
108, 112, 120: user plane processing unit
110, 114, 122: load measurement unit
116, 124: subordinate cell processing unit
126: redirected cell determination unit
128, 204: control plane processing unit
130: network interface
206: control unit
208: reception quality measurement unit
210: reception quality determination unit

BEST MODE FOR CARRYING OUT THE INVENTION

The best mode for carrying out the present invention is described with reference to the drawings in conjunction with embodiments as presented below.

Throughout all the drawings for illustrating the embodiments, the same reference symbols may be used for objects with the same function, and the objects may not be repeatedly described.

A mobile communication system including a base station and a mobile station according to one embodiment of the present invention is described with reference to FIG. 2.

In this embodiment, the mobile communication system includes a base station or eNode B (eNB) and a mobile station or user equipment (UE).

In the base station, an operator may operate several carriers, such as a 20 MHz carrier, a 10 MHz carrier and a 5 MHz carrier, in one or more bands. For example, a licensed frequency band may be operated in a LTE system. As mentioned above, the term "band" used herein means a frequency band for operating the LTE system and may be 800 MHz band or 2 GHz band, for example. Also, the term "carrier" means a bandwidth for a system operated in a frequency band, and the demand in the LTE system may be that the carrier can correspond to any of 1.25 MHz, 2.5 MHz, 5 MHz, 10 MHz, 15 MHz and 20 MHz. In other words, either of 1.25 MHz, 2.5 MHz, 5 MHz, 10 MHz, 15 MHz or 20 MHz may be selected as the bandwidth of one carrier.

Figure 2:
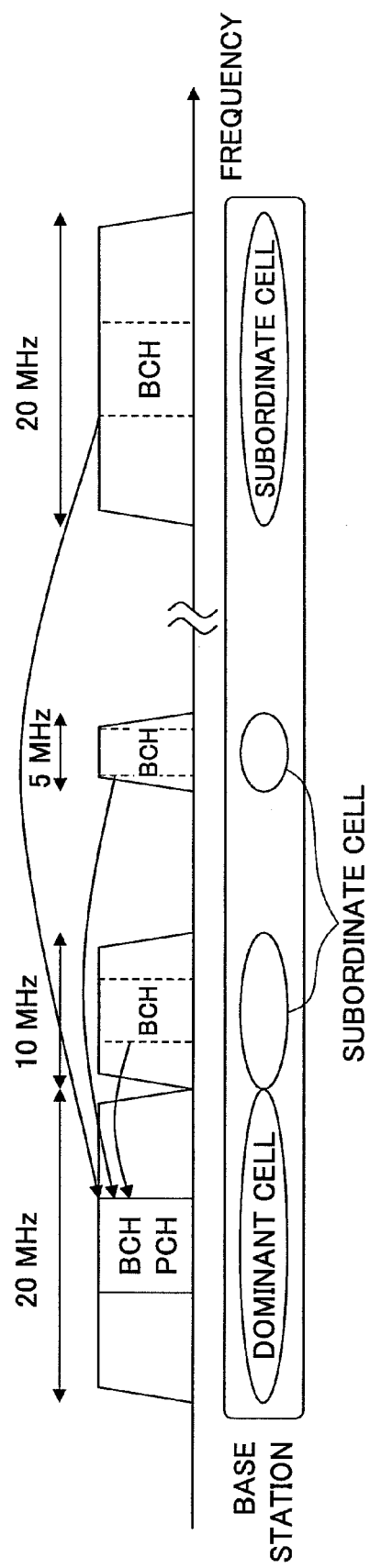
FIG. 2 is a schematic diagram illustrating an exemplary type of cell.

FIG. 2 illustrates one example where several carriers are operated in one band. In this example, two 20 MHz carriers, a 10 MHz carrier and a 5 MHz carrier are operated in one band. The carriers may be called cells.

In a certain carrier of the carriers operated in the band, for example, in only one 20 MHz carrier, a broadcast channel (BCH) for transmitting broadcast information and a paging channel for transmitting paging signals are transmitted. In the other carriers, the broadcast channel is transmitted without transmission of the paging channel, and only minimum information is transmitted in the broadcast channel. Such minimum information may include system frame number, dynamic persistence level for random access control and associated dominant cell carrier frequency code being information indicative of position of a carrier for transmitting the broadcast channel and the paging channel.

As mentioned above, the two types of carriers are provided for transmitting both the broadcast channel and the paging channel and for transmitting the minimum information in the broadcast channel without transmission of the paging channel. The two types of carriers (cells) are referred to as a dominant cell and a subordinate cell, respectively. In other words, the dominant cell allows a mobile station to not only wait in idle periods but also communicate in active periods and can transmit a synchronization channel, the broadcast channel, the paging channel and other channels. On the other hand, the subordinate cell does not allow a mobile station to wait in the idle periods but allows the mobile station to communicate in the active periods and can transmit the synchronization channel and the broadcast channel.

Also, a pair of cells included in the same band (frequency band) operated by the same base station are referred to as a cell set. The cell set includes at least one dominant cell. Also, the cell set may include one or more subordinate cells.

For example, as illustrated in FIG. 3, one base station (eNB1) is provided, and Band A and Band B are operated in the base station. Three carriers (cells) fA1, fA2 and fA3 are operated in Band A, and two carriers fB1 and fB2 are operated in Band B. For example, the carriers fA1, fA2, fA3, fB1 and fB2 may be 10 MHz. Alternatively, the carriers fA1, fA2, fA3, fB1 and fB2 may be 5 MHz or 20 MHz.

In FIG. 3, the carriers fA1 and fB1 are dominant cells. On the other hand, the carriers fA2, fA3 and fB2 are subordinate cells. Cells in the same Band A, that is, a set of the carriers fA1, fA2 and fA3, constitute one cell set, and cells in the same Band B, that is, a set of the carriers fB1 and fB2, constitute another cell set.

Also, the same operation is carried out in at least one base station, such as eNB2, provided at a location different from the base station eNB1, and if the dominant cells, the subordinate cells and the cell sets are defined in that base station, a set of cells in the same carrier are referred to as a cell layer. In other words, the cell layer includes cells having the same central frequency and bandwidth.

In FIG. 3, fA1, fA2, fA3, fB1 and fB2 operated in eNB1 are paired to fA1, fA2, fA3, fB1 and fB2 operated in eNB2, respectively, and the resulting pairs are referred to as cell layers.

In a base station including multiple sectors, a dominant cell, a subordinate cell and a cell set are defined within the sectors. For example, if a base station includes three sectors each of which has one dominant cell and three subordinate cells, the base station would have 12 cells in total. Also in this case, the cell layer represents cells including the same central frequency and the same bandwidth. Thus, the cell layer may include multiple sectors and/or cells for multiple base stations. Particularly if cells having the same central frequency and the same bandwidth across a network are operated with multiple sectors by multiple base stations, these cells may be collectively referred to as a cell layer.

Traffic load balancing between the dominant cell and the subordinate cell may be critical. In the mobile communication system according to this embodiment, information on a redirected cell is included in a paging message, and a relevant mobile station is redirected to another carrier. As a result, the mobile communication system according to this embodiment could redirect a mobile station into another carrier only at call reception.

Figure 4:
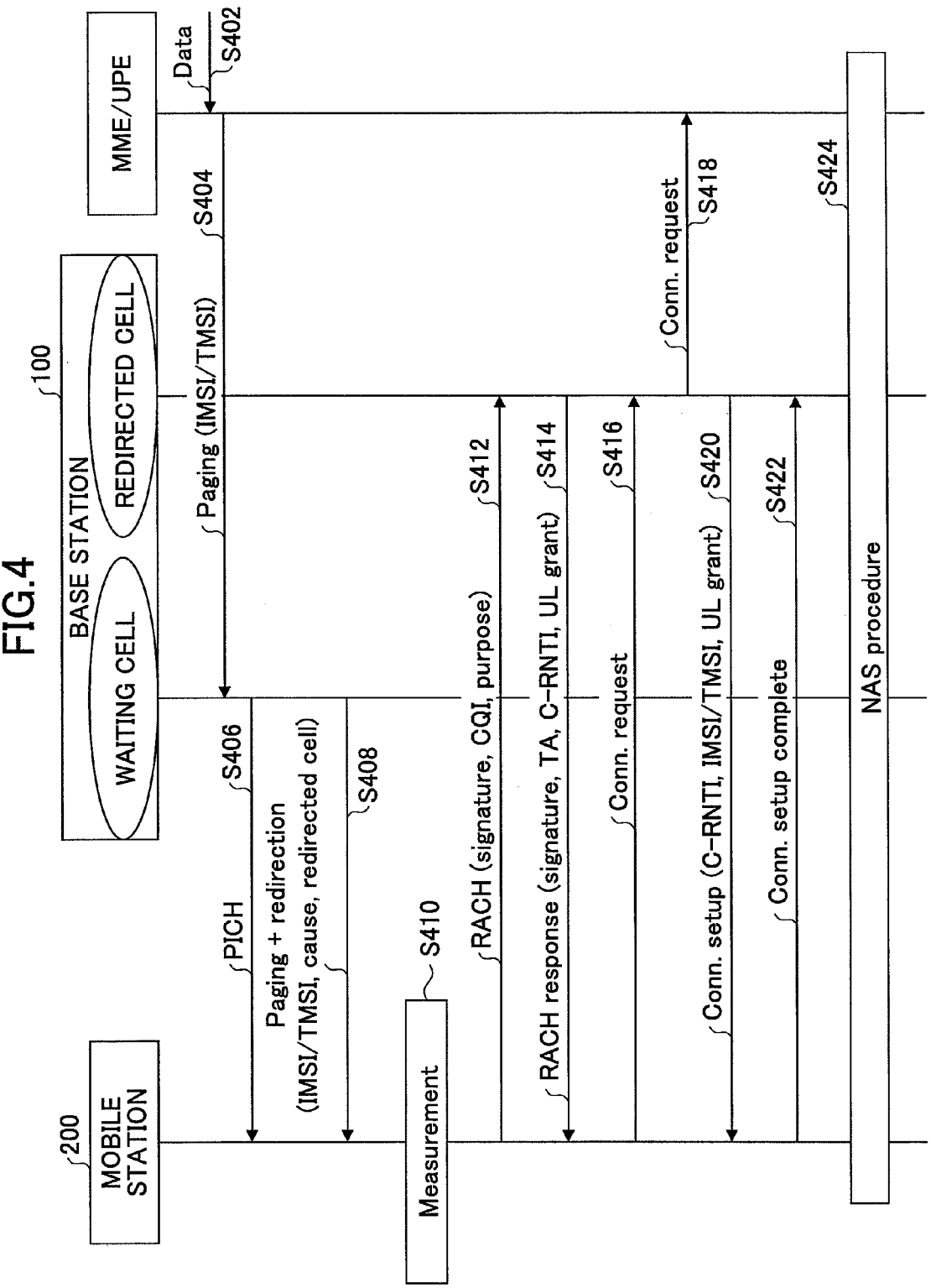
FIG. 4 is a flow diagram illustrating an exemplary operation of a mobile communication system according to one embodiment of the present invention.

An exemplary operation of the mobile communication system according to this embodiment is described with reference to FIG. 4. This embodiment is described for the base station 100 that operates one dominant cell and one subordinate cell, but the present invention can be also applied to other situations where the base station 100 operates several dominants and subordinates.

Also in this embodiment, a dominant cell where the mobile station 200 is waiting for calls is referred to as a waiting cell, and a cell to which the mobile station 200 is to be redirected is referred to as a redirected cell. This redirected cell may be a dominant cell or a subordinate cell. In some embodiments, the base station 100 may select the waiting cell as the redirected cell, but in this embodiment, the waiting cell is different from the redirected cell. In other embodiments, the base station 100 may specify a cell layer to which the mobile station 200 is to be redirected. In the embodiments, the mobile station 200 may select a cell from the specified cell layer.

At step S402, data transmitted from a core network is buffered in an access gateway (aGW) serving as an upper station. If this access gateway is represented as a logical node, it may be called MME/UPE where the MME means a logical node for a control plane (C-Plane) and the UPE means a logical node for a user plane (U-Plane).

The MME calls the mobile station 200. Since the MME holds location registration information and knows a tracking area to be paged, at step S404, the MME transmits a paging signal to base stations within the tracking area. For example, the tracking area is defined in LTE and may include multiple cells. The tracking area represents an area to be paged and may include an area covered by several cells. The mobile station 200 registers only information indicative of the tracking area where it currently resides with the network side. When the mobile station 200 is paged, the network side does not know the cell within the tracking area where the mobile station 200 resides. Thus, a paging signal is transmitted for all cells within the tracking area.

Each cell broadcasts the tracking area to which the cell belongs, and a mobile station confirms the tracking area for the waiting cell in a waiting period. If the waiting cell is changed and accordingly the tracking area is changed, the mobile station registers with the network modification of the tracking area. This is called tracking area update (TAU).

In the base station 100, the waiting cell pages the mobile station 200 based on the paging signal transmitted from the MME/UPE. For example, the waiting cell may transmit a paging indicator channel at step S406, and transmit a paging channel at step S408. The paging channel may include information indicative of a redirected cell as well as other information such as "cause ID" indicative of communication types and IMSI/TMSI (International Mobile Subscriber Identifier/Temporary Mobile Subscriber Identifier).

Upon receiving the paging channel, the mobile station 200 determines whether the paging channel includes the global ID of the mobile station 200, that is, whether the IMSI/TMSI is included in the paging channel, and if so, at step S410, the mobile station 200 measures reception quality for the redirected cell specified in the paging channel. Then, if the reception quality of the redirected cell does not satisfy a predefined threshold, the mobile station 200 determines that it does not switch to the redirected cell. In this case, the mobile station 200 accesses the waiting cell.

On the other hand, if the reception quality of the redirected cell satisfies the predefined threshold, at step S412, the mobile station 200 switches its presently used frequency to the redirected cell and accesses a random access channel (RACH). For example, the RACH may include a signature, a CQI (Channel Quality Indicator), purpose and other information.

At step S414, the redirected cell transmits a response to the RACH (RACH response) to the mobile station 200. For example, the RACH response may include a signature, a TA (Timing Advance), c-RNTI (Cell specific-Radio Network Temporary ID) and UL grant information.

A connection request is transmitted in an uplink based on the RACH response. In LTE, it is conceived that a shared channel may be used also in the uplink for scheduling. The base station 100 specifies a time frame, a frequency block and an information amount as the UL grant. The frequency block may be referred to as a resource block or in uplinks as a resource unit. Since a SC-FDMA (Single Carrier-Frequency Division Multiple Access) scheme is applied in the uplinks, resource units consisting of a predefined one of several sub-carriers are provided, and a resource unit to be used is specified from the resource units.

The C-RNTI is an ID used in RAN to identify a mobile station.

The TA is described. The UL grant specifies a time frame and a frequency block transmitted in an uplink shared channel, but since propagation delay is different depending on location of mobile stations within a cell, transmission at the same timing may cause reception timing difference at the base station 100, which may result in overlap between time frames on the time axis. In order to accommodate reception timings within a predefined time frame, transmission timing must be adjusted. Information for adjusting the transmission timing is called the TA.

At step S416, the mobile station 200 transmits a connection request (Conn. request) to the redirected cell.

At step S418, the redirected cell transmits the Conn. request to the MME/UPE.

At step S420, the redirected cell transmits a connection setup to the mobile station 200. This connection setup may include the C-RNTI, the IMSI/TMSI and the UL grant.

At step S422, the mobile station 200 transmits a connection setup complete indicative of connection completion to the redirected cell.

At step S424, a NAS (Non-Access Stratum) process is performed. The NAS process is a control sequence exchanged between an upper node and a mobile station, and encryption parameters may be set in the NAS process, for example.

Among the above-mentioned steps, steps S414-S424 are simply illustrative and can be modified as needed except that the mobile station 200 is informed of the redirected cell in the paging channel and that the mobile station 200 measures reception quality of the redirected cell specified in the paging channel and if it satisfies a predefined threshold, the mobile station 200 accesses the redirected cell.

In this embodiment, the mobile station 200 informs the base station 100 of the capacity of the mobile station 200. In another embodiment, the MME/UPE may instead store the capacity of mobile stations and if downlink paging occurs, the MME/UPE informs the base station 100 of the capacity of mobile stations. Specifically, the capacity of mobile stations may be transmitted at step S404.

Upon being powered ON, the mobile station 200 activates a procedure called an attach. In this attach procedure, the capacity of the mobile station 200 may be stored in the MME/UPE.

Figure 5:
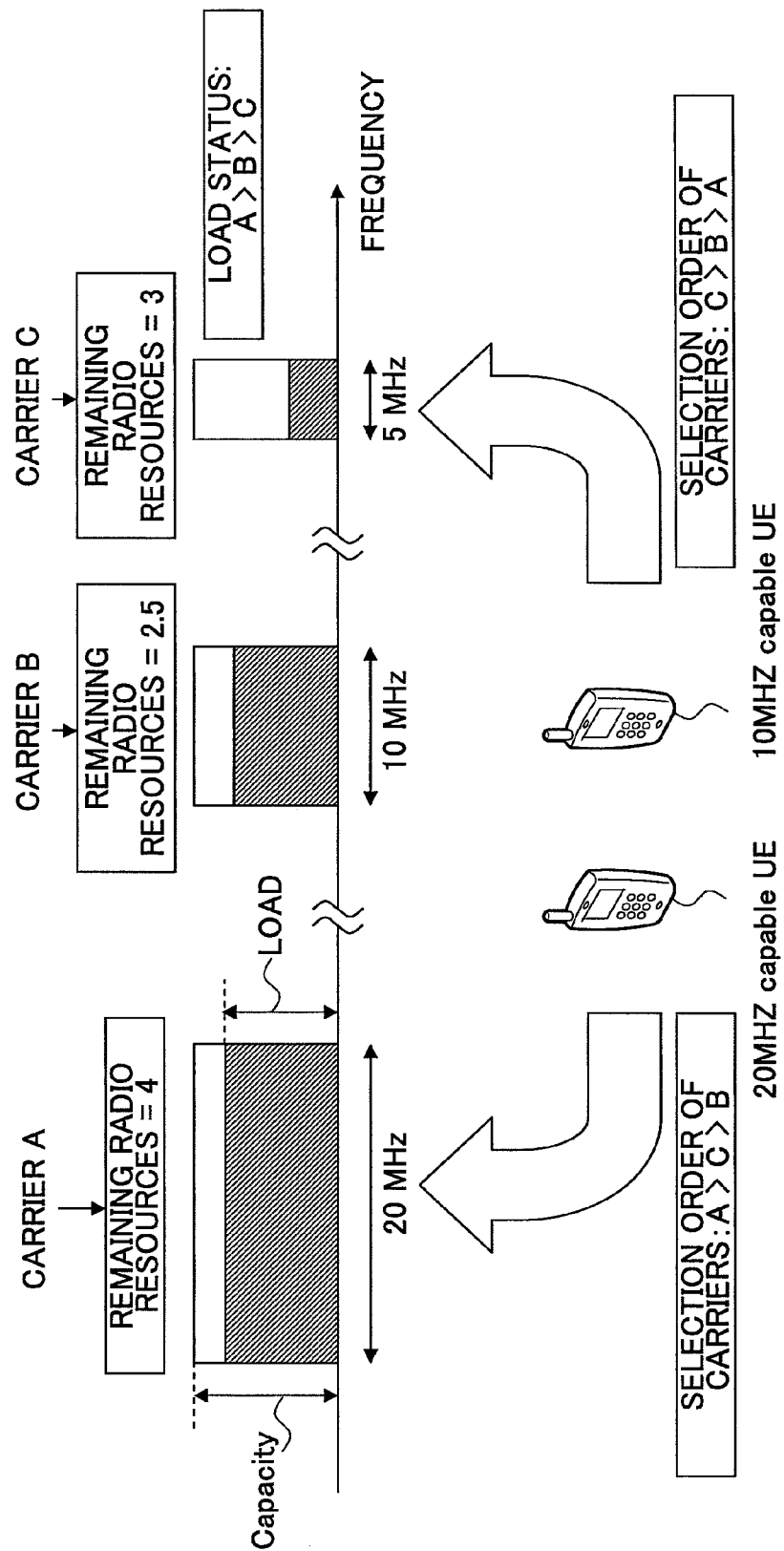
FIG. 5 is a schematic diagram illustrating an exemplary method of selecting a redirected cell according to one embodiment of the present invention.

An exemplary method of determining a redirected cell in the base station 100 is described with reference to FIG. 5.

The base station 100 computes the load status for each cell, for example, the load statuses for a dominant cell and a subordinate cell, and determines a redirected cell based on the load statuses. In fact, the load status may be different for individual cells and/or at separate time points. The base station 100 determines the redirected cell based on such dynamically variable load statuses.

Also, the base station 100 may select the redirected cell based on the capabilities of mobile stations in addition to the load statuses for the cells. For example, it is assumed that carriers A, B and C are operated in a certain band and the bandwidths of cells A, B and C are 20 MHz, 10 MHz and 5 MHz, respectively. The ratio of remaining radio resources is assumed as cell A:cell B:cell C=4:2.5:3 and the load status is assumed as A>B>C.

An exemplary method of determining a redirected cell in the base station 100 under this situation is described.

In the LTE, the minimum transmission and reception capability of a mobile station is set to be 10 MHz. In the LTE, it is required that a system be applicable to bandwidths of 1.25 MHz, 2.5 MHz, 5 MHz, 10 MHz, 15 MHz and 20 MHz as the cell bandwidths as stated above. For example, if an operator is licensed for 20 MHz, the system is operated with the bandwidth of 20 MHz.

In this case, the mobile stations with the transmission and reception capability of 10 MHz can communicate without problems in cells operated in frequency bands less than or equal to 10 MHz, that is, in cells operated in frequency bands of 1.25 MHz, 2.5 MHz, 5 MHz and 10 MHz. However, these mobile stations would communicate in a cell operated in bandwidth of 20 MHz by using a portion of the frequency band of 20 MHz.

As a result, for the mobile stations with the transmission and reception capability of 20 MHz, it may be the best to select the carrier A. Although the carrier A is most congested, that is, the load status is the highest in the carrier A, four units of the remaining radio resources are available in the carrier A. Thus, assignment of the mobile stations to the carrier A could most greatly improve throughput. Then, the carrier C has the second largest amount of the remaining radio resources, and thus the carrier C may be next selected. Finally, the carrier B may be selected.

On the other hand, for mobile stations with the transmission and reception capability of 10 MHz, if the carrier A is selected, the remaining radio resources would be equal to 4 units. Since the carrier A is operated in the bandwidth of 20 MHz, only a half of the bandwidth can be used, and only 2 units of the remaining radio resources may be actually used. In this case, thus, it may be the best to select the carrier C. Then, since the carrier B has the second largest amount of the remaining radio resources, the carrier B may be next selected. Finally, the carrier A may be selected.

Also, for the mobile stations with the transmission and reception capability of 10 MHz, the remaining radio resources of the carriers A, B and C are determined at 2:2.5:3, and the carrier C has the largest amount of the remaining radio resource; the carrier B has the second largest amount of the remaining radio resource; and the carrier A has the smallest amount of the remaining radio resource. As a result, the carrier C may be selected. However, the carrier C has the bandwidth of 5 MHz, and the carrier B with the bandwidth of 10 MHz may happen to be congested and then the load of the carrier B may be reduced some time later. Thus, if the difference of the remaining radio resources between the carriers is less than or equal to a predefined threshold, a carrier with a greater bandwidth may be assigned. In the above-mentioned case, since the difference of the remaining radio resources between the carriers C and B is relatively small (3−2.5), the carrier B may be selected.

As mentioned above, a different cell may be selected under the same load status depending on the transmission and reception capability of a mobile station (10 MHz or 20 MHz).

Figure 6:
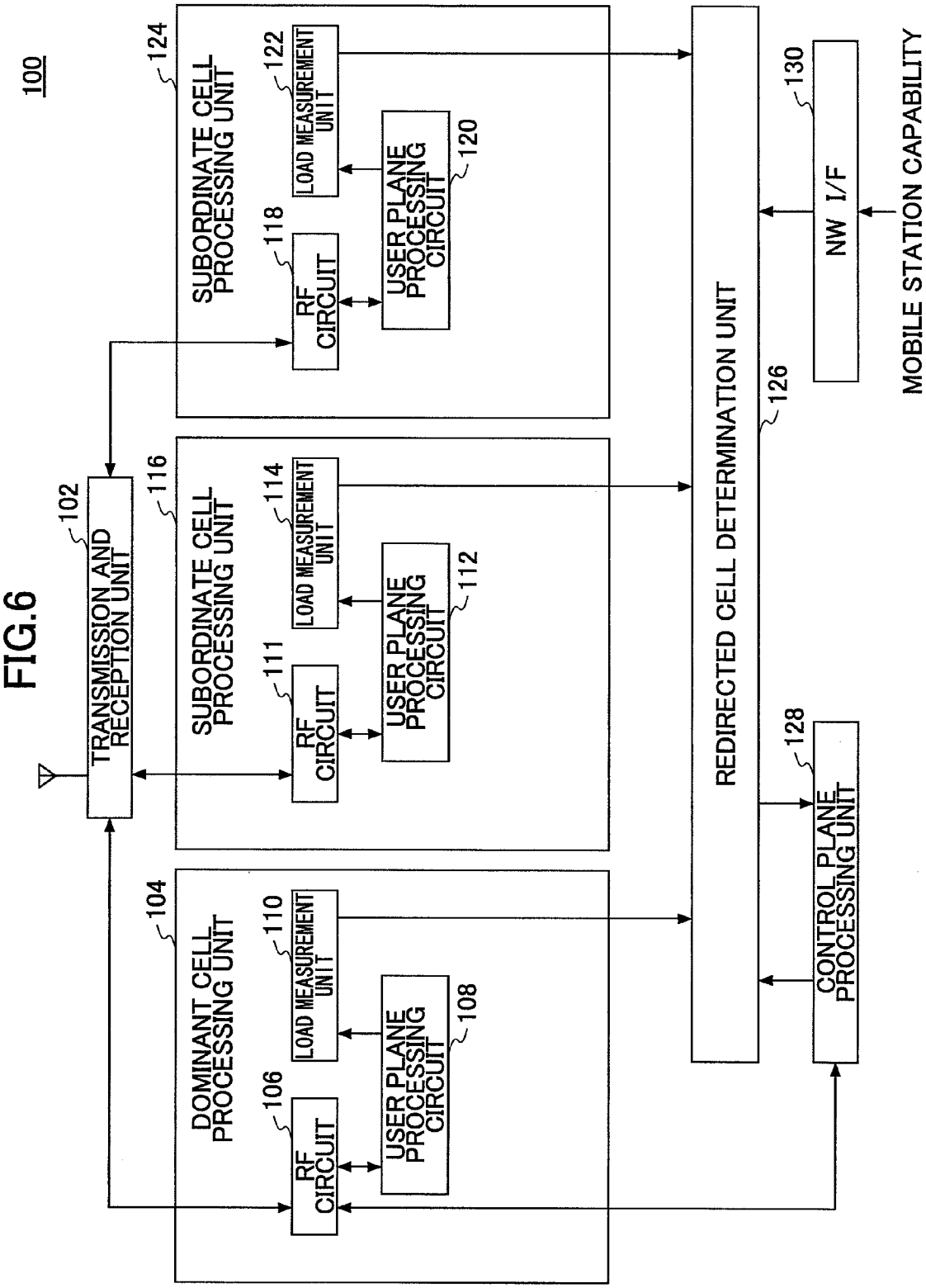
FIG. 6 is a partial block diagram illustrating a base station according to one embodiment of the present invention.

Next, an exemplary specific configuration of the base station 100 according to this embodiment is described with reference to FIG. 6.

This embodiment is described for the base station 100 that operates cells fA1, fA2 and fA3 in Band A, but the present invention can be applied to a base station that operates several bands or a base station that operates several cells (carriers) in each band. In the present embodiment, the cell fA1 is referred to as a dominant cell, and the cells fA2 and fA3 are referred to as subordinate cells.

The base station 100 includes a transmission and reception unit 102 with an antenna, a dominant cell processing unit 104, subordinate cell processing units 116, 124, a redirected cell determination unit 126, a control plane processing unit 128, and a network interface 130. In the dominant cell processing unit 104 and the subordinate cell processing units 116, 124, carriers with the central frequency fA1, fA2 and fA3, respectively, are operated.

The dominant cell processing unit 104 includes a RF circuit 106, a user plane processing unit 108 and a load measurement unit 110.

The subordinate cell processing units 116, 124 include RF circuits 111, 118, user plane processing units 112, 120 and load measurement units 114, 122, respectively.

The dominant cell processing unit 104 performs some operations on a waiting cell where the mobile station 200 is waiting for calls. Also, the dominant cell processing unit 104 performs some operations on a redirected cell determined based on the capability of the mobile station 200.

The subordinate cell processing units 116, 124 perform some operations on the redirected cell determined based on the capability of the mobile station 200.

The user plane processing units 108, 112 and 120 instruct the load measurement units 110, 114 and 122, respectively, to measure the load at a predefined interval.

In response to the instructions from the user plane processing units 108, 112 and 120, the load measurement units 110, 114 and 122 measure the load, for example, traffic, and supply the results (load status) to the redirected cell determination unit 126.

As mentioned above, if the capability of the mobile station 200 is stored in the MME/UPE, the capability is supplied to the redirected cell determination unit 126 via the network interface 130.

Also, if the capability is supplied from the mobile station 200, information indicative of the capability supplied from the mobile station 200 is received at the RF circuit 106 via the transmission and reception unit 102 and supplied to the control plane processing unit 128. The control plane processing unit 128 supplies the information on the capability to the redirected cell determination unit 126.

In this embodiment, the capability of a mobile station may include information indicative of whether the mobile station corresponds to only Band A or whether the mobile station corresponds to Bands A and B, that is, information indicative of a frequency band. In addition, the capability of the mobile station may include information indicative of a bandwidth where the mobile station is allowed for transmission and reception, for example, information indicative of whether the mobile station corresponds to 10 MHz or 20 MHz. For example, capability information elements of a mobile station may include the number of bands, that is, the number of frequency bands, a band indicator, that is, information indicative of each frequency band, and a bandwidth where the mobile station is allowed for transmission and reception, for example, information indicative of 10 MHz or 20 MHz.

The redirected cell determination unit 126 uses the above-mentioned method to determine based on the load status supplied from the load measurement units 110, 114 and 122 whether to cause the mobile station 200 to be redirected. If so, the redirected cell determination unit 126 determines a redirected cell and supplies it to the control plane processing unit 128. Alternatively, the redirected cell determination unit 126 may use the above-mentioned method to determine based on the information indicative of the capability of the mobile station 200 supplied via the network interface 130 in addition to the load status whether to cause the mobile station 200 to be redirected, and if so, the redirected cell determination unit 126 may determine a redirected cell and supply it to the control plane processing unit 128. If the redirected cell determination unit 126 determines that the mobile station 200 is not to be redirected, the redirected cell determination unit 126 performs no operation.

Also, the redirected cell determination unit 126 may select cells predefined corresponding to services. For example, in reception of MBMS (Multimedia Broadcast/Multicast Service), a cell to which the MBMS is transmitted or other cells belonging to a band including the cell to which the MBMS is transmitted is selected as a redirected cell. For example, if the waiting cell is served by fA1 and the MBMS is provided by fB2, the redirected cell determination unit 126 receives the MBMS. In addition, if the redirected cell determination unit 126 selects fA2 and fA3 to use a unicast service concurrently, it would be difficult to receive the MBMS in fB2. Thus, the redirected cell determination unit 126 may select fB1 or use the unicast service within the MBMS carrier in fB2.

Also, for example, users of VoIP (Voice over Internet Protocol) may be assigned to the same band/carrier. In the VoIP, small delay is required, and the VoIP has a feature of a low transmission rate. For these users, the same band/carrier may be selected for improved radio efficiency.

Also, for example, flexible services, that is, services available even if some delay occurs, such as a Web browsing service and a file downloading service, and inflexible services such as the VoIP and a streaming service may be balanced in all carriers for assignment.

Also, a cell with better coverage may be selected for a premium user. For example, for a cell operated in the 2 GHz band and a cell operated in the 800 MHz band, the cell operated in the 800 MHz may generally have better propagation conditions. Thus, the cell operated in the 800 MHz band may be selected for the premium users as the predefined cell.

Alternatively, the redirected cell determination unit 126 may select the redirected cell based on traffic load. For example, the redirected cell may be selected based on the amount of the remaining resources and transmission power as mentioned above. Alternatively, for example, the redirected cell may be selected based on traffic load for each type of service as mentioned above.

Alternatively, the redirected cell determination unit 126 may select the redirected cell based on traveling speed of the mobile station 200. For example, for fast moving mobile stations, a cell belonging to a smaller number of cells and having a greater cell radius and broader coverage may be determined as the redirected cell. On the other hand, for slower moving mobile stations, a cell belonging to a larger number of cells and having a smaller cell radius may be determined as the redirected cell.

The control plane processing unit 128 generates and transmits a paging channel based on information for specifying the redirected cell supplied from the redirected cell determination unit 126. This paging channel may include information of the redirected cell in addition to IMSI/TMSI cause ID.

The paging channel generated by the control plane processing unit 128 is transmitted to the mobile station 200 via the RF circuit 106 and the transmission and reception unit 102.

Figure 7:
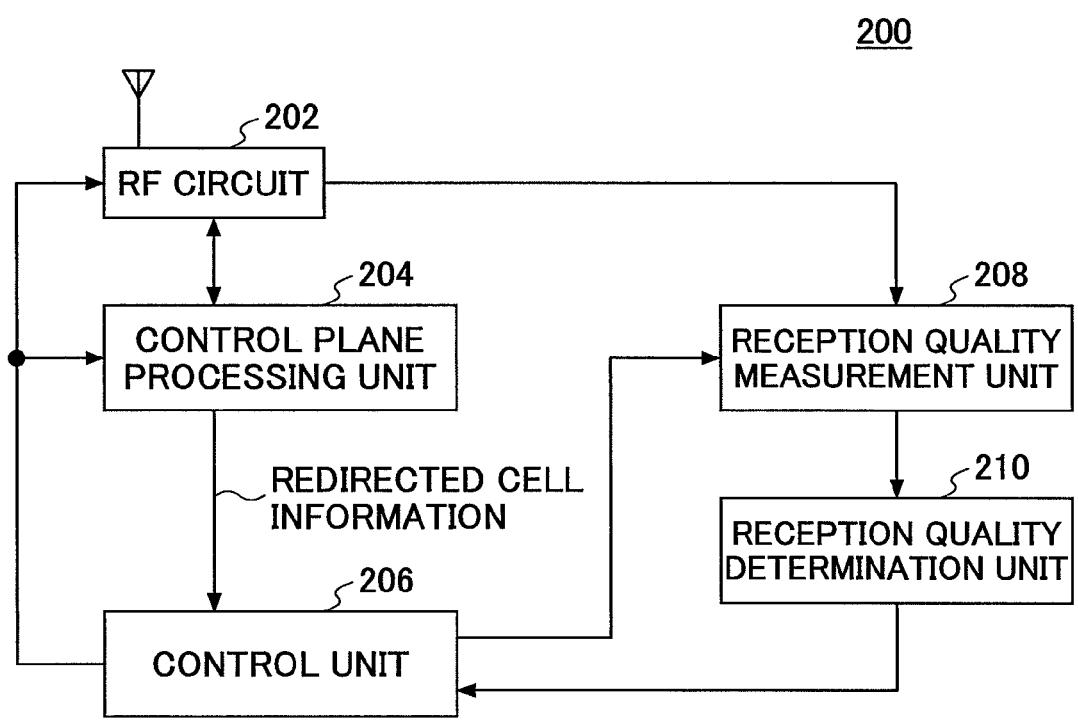
FIG. 7 is a partial block diagram illustrating a mobile station according to one embodiment of the present invention.

Next, an exemplary specific configuration of the mobile station 200 according to this embodiment is described with reference to FIG. 7.

The mobile station 200 includes a RF circuit 202, a control plane processing unit 204, a control unit 206, a reception quality measurement unit 208 and a reception quality determination unit 210.

A paging channel transmitted from the base station 100 is received at the control plane processing unit 204 via the RF circuit.

The control plane processing unit 204 determines whether the paging channel includes redirected cell information and supplies the result to the control unit 206.

If the paging channel includes the redirected cell information, the control unit 206 instructs the reception quality measurement unit 208 to measure the reception quality of the redirected cell. In response to the instruction from the control unit 206, the reception quality measurement unit 208 measures the reception quality of the redirected cell and supplies it to the reception quality determination unit 210.

The reception quality determination unit 210 instructs the control unit 206 to access the redirected cell if the supplied reception quality satisfies a predefined threshold and otherwise instructs the control unit 206 to access the waiting cell.

The control unit 206 controls the RF circuit 202 and the control plane processing unit 204 corresponding to the instruction from the reception quality determination unit 210.

Since LTE downlinks are in OFDM (Orthogonal Frequency Division Multiplexing), a space diversity effect could be efficiently obtained by applying SFN (Single Frequency Network) combining. The SFN combining is a diversity method using a principle that if the same information is transmitted in the same resource block at the same timing from multiple cells, that is, multiple sectors resulting from division of an area covered by the same base station, signal combination spontaneously occurs over radio transmission paths, thereby resulting in apparent amplification at reception by a mobile station due to the combination of the same signals. A receiver of the mobile station does not have to have a complicated arrangement compared to a RAKE combining receiver as used in 3G systems and can be arranged as a single receiver regardless of application of the SFN combining.

Since the SFN combining is applied to paging, the same redirected cell information can be used in paging messages over multiple cells. In particular, synchronization can be easily maintained between cells controlled under the same base station, and thus the SFN combining can be easily implemented. Here, the same redirected cell information over multiple sectors in the same cell layer under the same base station is specified in paging from dominant cells with the same central frequency and the same bandwidth. In this manner, the SFN combining effect can be obtained among the sectors under the same base station. In an inter base station synchronization system, the same redirected cell information is used in cells in multiple base stations. In this case, an algorithm is required to select the same redirected cell among the multiple base stations. For example, information may be exchanged via a network to select the same redirected cell. In this manner, the application of the SFN combining to paging can significantly reduce transmission power for paging channels.

According to this embodiment, the waiting cell is limited to the dominant cell, and thus a mobile station has to measure only cells adjacent to the dominant cell while waiting for calls, resulting in reduction in the load for adjacent cell measurement by the mobile station in the waiting period. In addition, the mobile station can be connected to a redirected cell determined in the base station depending on the capability of the base station, cell bandwidth and congestion, and thus appropriate load balancing can be achieved.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2006-225929 filed on Aug. 22, 2006, the entire contents of which are hereby incorporated by reference.

Industrial Applicability

A base station, a mobile station and a redirected cell determination method according to the present invention can be applied to a radio communication system.

The invention claimed is:

1. A base station for operating multiple cells each having a predefined bandwidth, comprising:
   a load measurement unit configured to measure traffic status in each of the cells;
   a redirected cell determination unit configured to determine either a redirected cell or a cell layer as redirected cell information for redirecting a mobile station operating in standby mode based on the traffic status and a type of service received by the mobile station, the redirected cell and the cell layer to which the mobile station is to be redirected; and
   a transmission unit configured to transmit the redirected cell information to the mobile station in a paging channel to enable the mobile station to establish a connection to the redirected cell or a cell selected from the cell layer in response to call reception from the base station,
   wherein the redirected cell determination unit determines the redirected cell or the cell layer based on whether the service is available to the mobile station even in delay occurrence.

2. The base station as claimed in claim 1, wherein the redirected cell determination unit is configured to determine either the redirected cell or the cell layer based on a remaining radio resource in each of the cells.

3. The base station as claimed in claim 1, wherein the transmission unit is configured to transmit paging channels including uniform redirected cell information at a uniform timing in cells with uniform central frequency and bandwidth between sectors resulting from division of an area covered by the base station.

4. A mobile station, comprising:
   a reception quality measurement unit configured to measure reception quality in either a redirected cell or a cell layer specified by a base station; and
   a control plane processing unit configured to establish a connection to either the redirected cell or a cell selected from the cell layer if the measured reception quality satisfies a predefined threshold,
   wherein the base station operates multiple cells each having a predefined bandwidth, measures traffic status of each of the cells, determines either the redirected cell or the cell layer for the mobile station operating in standby mode based on the traffic status and a type of service received by the mobile station and transmits either the redirected cell or the cell layer determined in a paging channel to enable the mobile station to establish a connection to the redirected cell or a cell selected from the cell layer in response to call reception from the base station, and
   wherein the base station determines the redirected cell or the cell layer based on whether the service is available to the mobile station even in delay occurrence.

5. A method of determining a redirected cell, comprising:

measuring traffic status of multiple cells at a base station, each of the cells having a predefined bandwidth and operated by the base station;

determining either a redirected cell or a cell layer at the base station as redirected cell information for redirecting a mobile station operating in standby mode based on the traffic status and a type of service received by the mobile station, the redirected cell and the cell layer to which the mobile station is to be redirected; and transmitting the redirected cell information from the base station to the mobile station in a paging channel to enable the mobile station to establish a connection to the redirected cell or a cell selected from the cell layer in response to call reception from the base station, wherein the determining comprises determining the redirected cell or the cell layer based on whether the service is available to the mobile station even in delay occurrence.

* * * * *